(12) United States Patent
Mixter

(10) Patent No.: US 12,271,806 B2
(45) Date of Patent: Apr. 8, 2025

(54) ARTIFICIAL NEURAL NETWORK TRAINING

(71) Applicant: Raytheon Company, Arlington, VA (US)

(72) Inventor: John E. Mixter, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 1302 days.

(21) Appl. No.: 16/678,474

(22) Filed: Nov. 8, 2019

(65) Prior Publication Data

US 2021/0142151 A1 May 13, 2021

(51) Int. Cl.
*G06N 3/047* (2023.01)
*G06F 17/18* (2006.01)
*G06N 3/084* (2023.01)

(52) U.S. Cl.
CPC ............. *G06N 3/047* (2023.01); *G06F 17/18* (2013.01); *G06N 3/084* (2013.01)

(58) Field of Classification Search
CPC ..................................................... G06N 3/047
See application file for complete search history.

(56) References Cited

U.S. PATENT DOCUMENTS 5,161,204 A * 11/1992 Hutcheson ............... G07C 9/25
708/821
5,479,576 A * 12/1995 Watanabe ................ G06N 3/08
700/1
2012/0303562 A1* 11/2012 Paguio ................. G11B 5/3163
706/19
2019/0159735 A1* 5/2019 Rundo ................. A61B 5/0261

FOREIGN PATENT DOCUMENTS

WO    WO-2021091614 A1    5/2021

OTHER PUBLICATIONS

"International Application Serial No. PCT US2020 049674, International Search Report mailed Dec. 11, 2020", 3 pgs.
"International Application Serial No. PCT US2020 049674, Written Opinion mailed Dec. 11, 2020", 8 pgs.
Dhaval, Dholakia, "Activation Functions", (Apr. 27, 2018), 1-9.
Nicol, Schraudolpk N, "Tempering Backpropagation Networks: Not All Weights are Created Equal", Advances In Neural Information Processing vol. 8, (Nov. 27, 1995), 563-569.
"International Application Serial No. PCT/US2020/049674, International Preliminary Report on Patentability mailed May 19, 2022", 10 pgs.

(Continued)

*Primary Examiner* — Hyun D Park
(74) *Attorney, Agent, or Firm* — Schwegman Lundberg & Woessner, P.A.

(57) ABSTRACT

An artificial neural network receives data for the inputs of a perceptron in the artificial neural network. The network determines an average of the data for each of the inputs of the perceptron, determines a standard deviation of the average for each of the inputs of the perceptron, and determines an average of the standard deviations for the perceptron. The network then sets a learning rate for the perceptron equal to the average of the standard deviations, and trains the artificial neural network using the learning rate for the perceptron.

20 Claims, 3 Drawing Sheets

(56) References Cited

OTHER PUBLICATIONS

"European Application Serial No. 20775778.2, Summons to Attend Oral Proceedings mailed May 16, 2024", 9 pgs.
"European Application Serial No. 20775778.2, Communication Pursuant to Article 94(3) EPC mailed Aug. 21, 2023", 9 pgs.
"European Application Serial No. 20775778.2, Response filed Oct. 7, 2024 to Summons to Attend Oral Proceedings mailed May 16, 2024", 4 pgs.

\* cited by examiner

ARTIFICIAL NEURAL NETWORK TRAINING

TECHNICAL FIELD

Embodiments described herein generally relate to systems and methods for training artificial neural networks, and in an embodiment, but not by way of limitation, training an artificial neural network based on the input data.

BACKGROUND

When training an artificial neural network, there are several hyper parameters whose values can be tuned and these values change the way that the neural network learns, and in particular, the speed and accuracy in which the neural network learns. One of the more important hyper-parameters is the learning rate, as the learning rate has a significant effect on the the amount of time that it takes to train the network and on the final accuracy of the network. The learning rate determines how much of the calculated error is used to modify weight values. High learning rates result in quick training times but are more likely to overshoot the best accuracies. Low learning rates are more likely to find good accuracies but, they lead to excessive training times. Finding a value that leads to good accuracy and reasonable training time is difficult.

One of the reasons that finding an appropriate learning rate or other hyper parameter is difficult to determine is that these hyper parameters must be swept. That is, many different values for a hyper parameter must be tried, and the neural network must be trained and retrained until the hyperparameter value that provides acceptable accuracy and timing (that is, trains in a reasonable amount of time) is determined.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
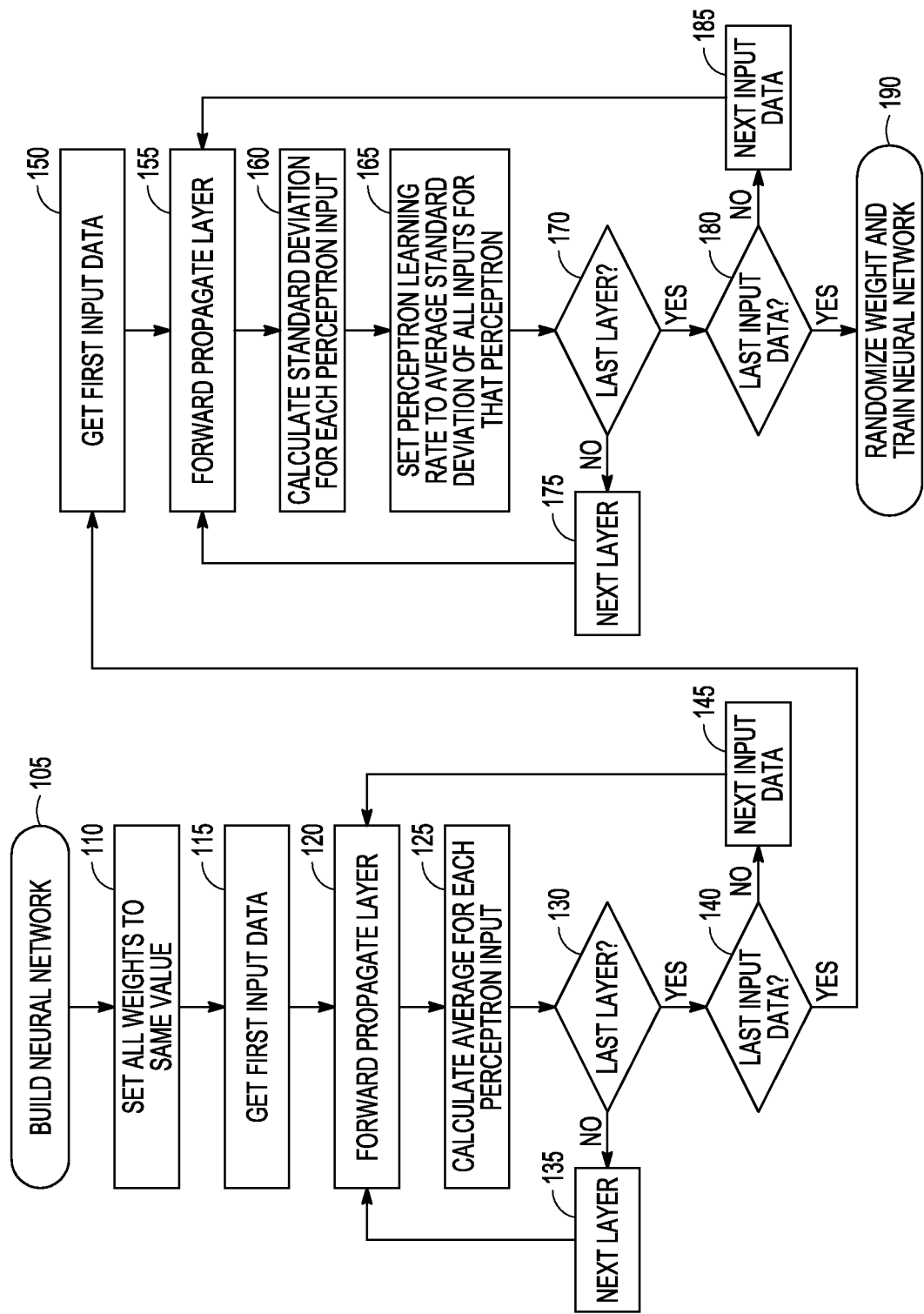
FIG. 1 is a block diagram of features and operations of an embodiment of a system and method to train a neural network.

A goal of an embodiment that trains artificial neural networks is to determine optimal values for as many hyper-parameters as possible. Since the learning rate is one of the main hyper parameters, tuning the learning rate can be important to realizing accurate results and reasonable training times.

As noted, a learning rate that is too low trains a neural network so that it provides an accurate result, but it takes too long to train the network with that low learning rate. Conversely, for a learning rate that is too high, that is, too aggressive, it takes less time to train the neural network, but the result is not as accurate. As a neural network is trained and its accuracy increases, the learning rate is reduced so weights are adjusted less with each iteration. The learning rate basically controls how much of a perceptron's calculated output error is used to adjust its weights. With the higher learning rate, the training results in a local minimum, and the local minimum may not be the right place to be. To address these issues, an embodiment uses the input training data to determine the best learning rate.

When training an artificial neural network, the output error for a perceptron is calculated. This error is based on what the result should be and the input value, and the error is multiplied by the learning rate, which is normally a small fraction. The product of the error and the learning rate is then multiplied by the input to the perceptron, and is then used to adjust the weight associated with the perceptron. For example, if the learning rate is set to a value of 1.0, the amount of error that is applied to adjust that weight would be the full error calculated. However, that is too large an error, and it causes the weight that is trying to be adjusted to fluctuate because there is a huge increase or decrease in the value of the weight when it is adjusted. As the learning rate is decreased to a fraction, for example 0.001, just a small amount of that calculated error is used to adjust the weight. A value of 0.001 is therefore a finer adjustment. Consequently, using a coarse adjustment of 1.0 for example trains the network, but the network never attains the right accuracy. The network would fluctuate all over the place. In contrast, if the learning rate is set to a fraction such as 0.001, the network will train a little slower, but the training results are more accurate because the 0.001 learning rate is a finer adjustment on the weights. Consequently, in training a neural network, the range of learning rate values must be swept to determine what value provides the best results. Such sweeping of the learning rate values consumes an inordinate amount of time. An embodiment therefore eliminates the need to sweep this range of learning rates by calculating the learning rate according to the input data. The inputs to a perceptron are analyzed to determine how much those inputs vary from one training set of input data (e.g., an image) to the next.

Additionally, in general, in the prior art, one learning rate is used for the entire neural network (a kind of a global variable). In contrast to a global learning rate, in an embodiment, different learning rates are calculated and used for every individual perceptron. A pre-training system and process to determine such different learning rates for each perceptron is as follows.

The pre-training process is performed a single time before the actual training of the artificial neural network is begun. Starting with the input layer, the standard deviation or other statistical measure at each perceptron input is determined when all training data are applied. Perceptrons that have widely varying input values will have higher initial learning rates, because these perceptrons have to work harder to achieve optimal weight values. Perceptrons that have relatively stable input values will have much lower initial learning rates.

More specifically, input data from one training data set are switched to data from another training set, and the network then examines the inputs to the perceptrons in different layers to determine how much they vary from each other. Perceptrons that have widely varying input data will require a larger learning rate in order to find the best accuracies. If the inputs do not vary that much from one data set to another in the same perceptron, then a smaller learning rate works well. The standard deviation for each of the inputs for a given perceptron is determined, and the average of those standard deviations for all of the inputs of that perceptron is determined, and the learning rate is set to that average of the standard deviations for that perceptron. Consequently, in most cases, every perceptron is going to have a different learning rate depending on the activity of its inputs.

To summarize, for each input for a particular perceptron (each perceptron can have hundreds or even thousands of different inputs), first an average is calculated for each of those many perceptron inputs, and then a standard deviation is calculated for each of those many perceptron inputs. Thereafter, an average of all the standard deviations for the inputs for the perceptron is calculated, and the particular learning rate for that particular perceptron is set to the average standard deviation value. The standard deviations are calculated for the first layer of the neural network, and then the same input data are applied to the next layer, and the standard deviations are calculated for that next layer. This continues layer by layer until the classifier layer is reached. After all the standard deviations are calculated, one layer at a time, the weights are then randomized and the neural network is trained in a normal fashion.

Additionally, in an embodiment, all the weights for each layer are initially set to the exact same value. This initial setting of all the weights permits the analysis of the actual variation of the input data. That is, what is present at the input to a perceptron is the variations of input data that have not been multiplied by random weight variables. In contrast, normally when a neural network is trained, all the weights in the network are set to random values.

Once the average standard deviations (and hence learning rates) are calculated for each perceptron in each layer, the network is ready to be trained, and all the weights then are set back to random values, and the network is trained using the different learning rates for each individual perceptron that has been calculated. With the many perceptrons in a neural network, it is possible that one or more perceptrons may have the same learning rate, but on the whole, the vast majority of perceptrons will have different learning rates.

Referring to FIG. 1, at 105, the process of building an artificial neural network is commenced. As noted earlier, this process includes the pre-training of one or more embodiments of this disclosure, and thereafter the traditional training of a neural network using back propagation and adjustment of the weights via the calculated errors in the network (and the individualized learning rates for each perceptron). The weights of the neural network are all set to the same value at 110, and the first set of input data is provided to the network at 115. At 120, the forward propagation of the network with the input data is begun. This forward propagation is executed first at the input layer, then in order at each successive intermediate layer, and finally at the classifier layer. At 125, the average of the input data is calculated for each input of each perceptron in the layer of the network that is currently being processed. As noted, the processing of a particular set of input data begins at the input layer, proceeds to the intermediate layers in proper order, and terminates at the classifier layer. At 130, the system determines if the processing of the particular input data set is at the last or classifier layer, and if it is not, the network proceeds to the next layer at 135, and begins forward propagating that next layer at 120. If it is determined at 130 that the last layer of the network has been reached, then at 140, the network determines if there is another set of input data, and if there is, then the pre-training continues with the next set of input data at 145, and continues onto operation 120 and the other forward propagation operations.

If it is determined at 140 that there is no more input data, then the network goes back to the first set of input data at 150, and once again forward propagates the current layer of the network at 155. During this forward propagation, as indicated at 160, a standard deviation for each input of each perceptron in the current layer being processed is calculated. At 165, for each perceptron in the current layer being processed, a standard deviation is calculated for each input of each perceptron, an average of the standard deviations for each perceptron is determined, and the learning rate for each particular perceptron is set to the average of the standard deviations for that perceptron. If it is determined at 170 that there are network layers remaining to be forward propagated, then the processing proceeds to the next network layer, at 175, and the forward propagation of the next network layer is begun at 155. If it is determined that the last layer has been processed for the current set of input data at 170, the network then determines if there are more input data at 180, and if there are, the network retrieves that next input data at 185, and begins the processing of that next input data at 155. If the network determines at 180 that there is no more input data, then the pre-training is complete, and the neural network can be trained in typical fashion at 190. As noted previously, this training of the neural network at 190 uses the different learning rates for each individual perceptron that were determined in operation 165.

Figure 2:
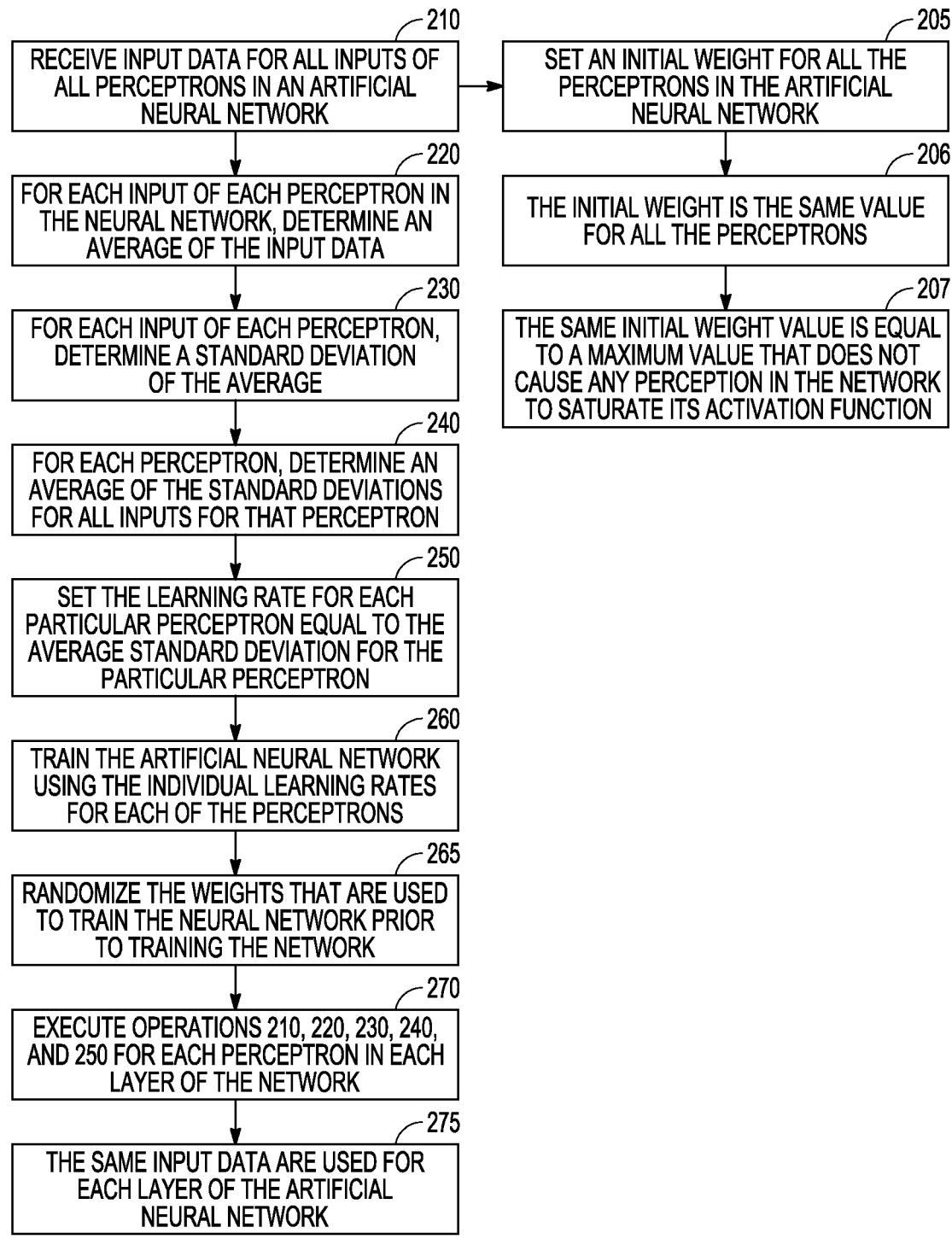
FIG. 2 is a block diagram of features and operations of another embodiment of a system and method to train a neural network.

FIG. 2 is another diagram illustrating a system and method for determining a learning rate for an artificial neural network. FIG. 2 includes process blocks 210-275. Though arranged substantially serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 2, at 210, an artificial neural network is trained by receiving input data for all inputs of all perceptrons in the artificial neural network. The input data are received and processed in the first layer, then the input data are supplied to the next layer and the layers thereafter until the input data are provided to the classifier layer. In an embodiment, as indicated at 205, an initial weight is set for all the perceptrons in the artificial neural network, at 206, the initial weight is the same value for all the perceptrons, and as indicated at 207, in an embodiment, the same value is equal to a maximum value that does not cause any perception in the network to saturate its activation function. When a perceptron saturates its activation function, the network is unable to further learn.

At 220, for each input of each perceptron in the neural network, an average of the input data is determined. Similarly, at 230, for each input of each perceptron, a standard deviation of the average is determined. At 240, for each perceptron, an average of the standard deviations for all inputs for that perceptron is determined. Thereafter, at 250, the learning rate for each particular perceptron is set to be equal to the average standard deviation for the particular perceptron. At 260, the artificial neural network is trained using the individual learning rates for each of the perceptrons. At 265, the weights that are used to actually train the neural network are randomized prior to training the network (after the perceptron learning rates have been calculated).

At 270, and as alluded to in connection with operation 210, operations 210, 220, 230, 240, and 250 are executed for each perceptron in each layer of the artificial neural network. This multiple execution of these operations generates an individualized learning rate for each perceptron in the artificial neural network, and the network is then trained using the individualized learning rate determined for each perceptron. Additionally, as indicated at 275, the same input data are used for each layer of the artificial neural network.

Figure 3:
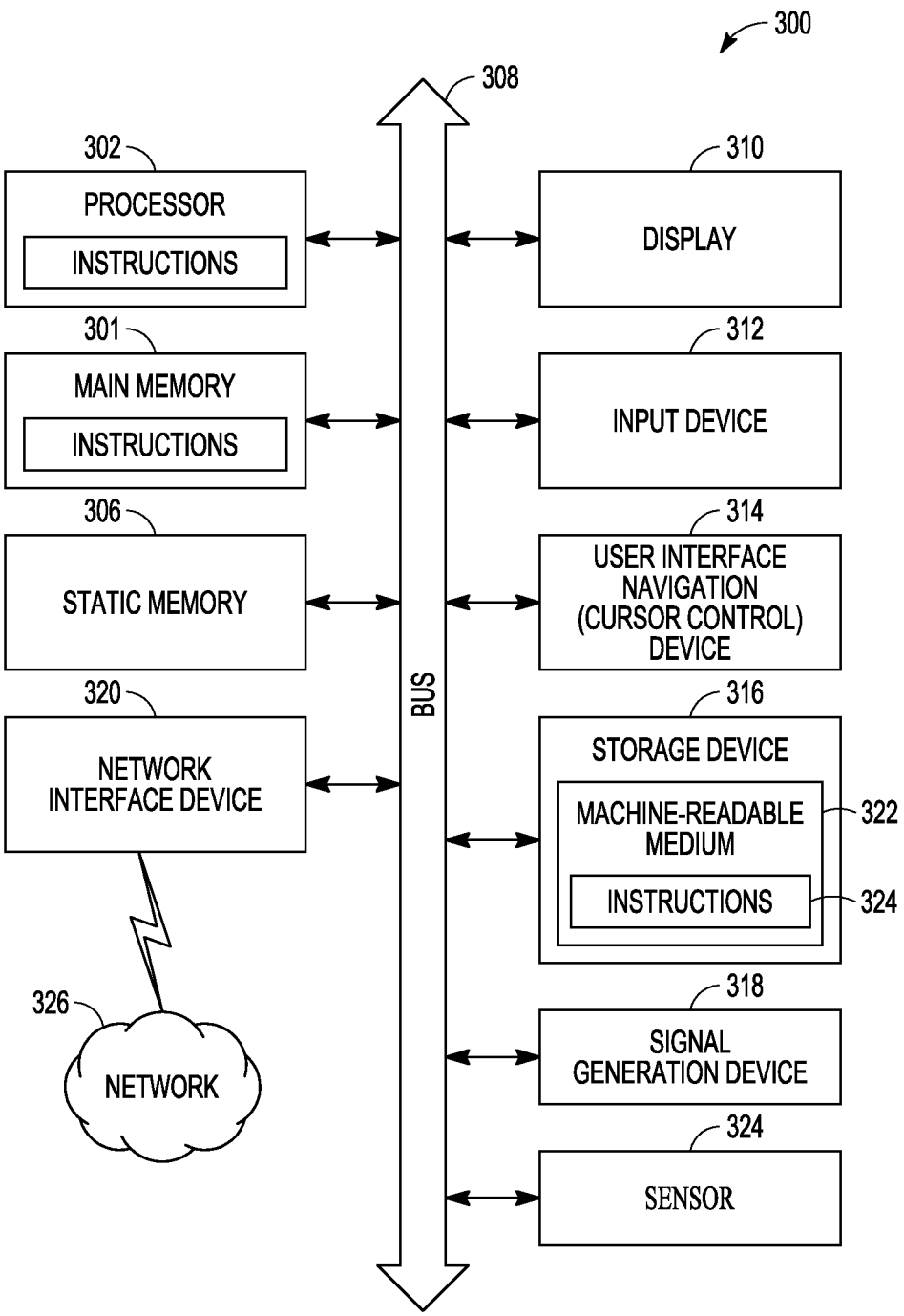
FIG. 3 is a block diagram of a computer architecture upon which one or more embodiments of the present disclosure can execute.

FIG. 3 is a block diagram illustrating a computing and communications platform 300 in the example form of a general-purpose machine on which some or all of the various embodiments disclosed herein can execute. In certain embodiments, programming of the computing platform 300 according to one or more particular algorithms produces a special-purpose machine upon execution of that programming. In a networked deployment, the computing platform 300 may operate in the capacity of either a server or a client machine in server-client network environments, or it may act as a peer machine in peer-to-peer (or distributed) network environments. Computing platform 300, or some portions thereof, may represent an example architecture of computing platform or external computing platform according to one type of embodiment.

Example computing platform 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computing platform 300 may further include a video display unit 310, input devices 312 (e.g., a keyboard, camera, microphone), and a user interface (UI) navigation device 314 (e.g., mouse, touchscreen). The computing platform 300 may additionally include a storage device 316 (e.g., a drive unit), a signal generation device 318 (e.g., a speaker), and a RF-environment interface device (RFEID) 320.

The storage device 316 includes a non-transitory machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computing platform 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 320 includes radio receiver circuitry, along with analog-to-digital conversion circuitry, and interface circuitry to communicate via link 308 according to various embodiments. Various form factors are contemplated for RFEID 320. For instance, RFEID may be in the form of a wideband radio receiver, or scanning radio receiver, that interfaces with processor 302 via link 308. In one example, link 308 includes a PCI Express (PCIe) bus, including a slot into which the NIC form-factor may removably engage. In another embodiment, RFEID 320 includes circuitry laid out on a motherboard together with local link circuitry, processor interface circuitry, other input/output circuitry, memory circuitry, storage device and peripheral controller circuitry, and the like. In another embodiment, RFEID 320 is a peripheral that interfaces with link 308 via a peripheral input/output port such as a universal serial bus (USB) port. RFEID 320 receives RF emissions over wireless transmission medium 326. RFEID 320 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process for training an artificial neural network comprising:
   (a) receiving input data for inputs of a perceptron in the artificial neural network;
   (b) determining an average of the input data for each of the inputs of the perceptron;
   (c) determining a standard deviation of the average for each of the inputs of the perceptron;
   (d) determining an average of the standard deviations for the perceptron;
   (e) setting a learning rate for the perceptron equal to the average of the standard deviations; and
   (f) training the artificial neural network using the learning rate for the perceptron.

2. The process of claim 1, comprising setting an initial weight for perceptrons in the artificial neural network before executing operations (a)-(e).

3. The process of claim 2, wherein the initial weight is set to the same value for all the perceptrons in the artificial neural network.

4. The process of claim 3, wherein the same value is equal to a maximum value that does not cause any perceptron in the network to saturate its activation function.

5. The process of claim 1, comprising randomizing a plurality of weights prior to training the artificial neural network after the perceptron learning rates have been calculated.

6. The process of claim 1, comprising executing operations (a)-(e) for each perceptron in each layer of the artificial neural network, thereby generating an individualized learning rate for each perceptron in the artificial neural network; and
training the artificial neural network using the individualized learning rate determined for each perceptron.

7. The process of claim 6, wherein the same input data are used for each layer of the artificial neural network.

8. A non-transitory computer readable medium comprising instructions that when executed by a processor executes a process comprising:
   (a) receiving input data for inputs of a perceptron in an artificial neural network;
   (b) determining an average of the input data for each of the inputs of the perceptron;
   (c) determining a standard deviation of the average for each of the inputs of the perceptron;
   (d) determining an average of the standard deviations for the perceptron;
   (e) setting a learning rate for the perceptron equal to the average of the standard deviations; and
   (f) training the artificial neural network using the learning rate for the perceptron.

9. The non-transitory computer readable medium of claim 8, comprising instructions for setting an initial weight for perceptrons in the artificial neural network before executing operations (a)-(e).

10. The non-transitory computer readable medium of claim 9, wherein the initial weight is set to the same value for all the perceptrons in the artificial neural network.

11. The non-transitory computer readable medium of claim 10, wherein the same value is equal to a maximum value that does not cause any perceptron in the network to saturate its activation function.

12. The non-transitory computer readable medium of claim 8, comprising instructions for randomizing a plurality of weights prior to training the artificial neural network after the perceptron learning rates have been calculated.

13. The non-transitory computer readable medium of claim 8, comprising instructions for executing operations (a)-(e) for each perceptron in each layer of the artificial neural network, thereby generating an individualized learning rate for each perceptron in the artificial neural network; and training the artificial neural network using the individualized learning rate determined for each perceptron.

14. The non-transitory computer readable medium of claim 13, wherein the same input data are used for each layer of the artificial neural network.

15. A system comprising:
a computer processor; and
a computer memory coupled to the computer processor;
wherein the computer processor is operable for:
(a) receiving input data for inputs of a perceptron in an artificial neural network;
(b) determining an average of the input data for each of the inputs of the perceptron;
(c) determining a standard deviation of the average for each of the inputs of the perceptron;
(d) determining an average of the standard deviations for the perceptron;
(e) setting a learning rate for the perceptron equal to the average of the standard deviations; and
(f) training the artificial neural network using the learning rate for the perceptron.

16. The system of claim 15, wherein the computer processor is operable for setting an initial weight for perceptrons in the artificial neural network before executing operations (a)-(e).

17. The system of claim 16, wherein the initial weight is set to the same value for all the perceptrons in the artificial neural network; and wherein the same value is equal to a maximum value that does not cause any perceptron in the network to saturate its activation function.

18. The system of claim 15, wherein the computer processor is operable for randomizing a plurality of weights prior to training the artificial neural network after the perceptron learning rates have been calculated.

19. The system of claim 15, wherein the computer processor is operable for executing operations (a)-(e) for each perceptron in each layer of the artificial neural network, thereby generating an individualized learning rate for each perceptron in the artificial neural network; and training the artificial neural network using the individualized learning rate determined for each perceptron.

20. The system of claim 19, wherein the same input data is used for each layer of the artificial neural network.

* * * * *

UNITED STATES PATENT AND TRADEMARK OFFICE
CERTIFICATE OF CORRECTION

| | | |
|---|---|---|
| PATENT NO. | : 12,271,806 B2 | Page 1 of 1 |
| APPLICATION NO. | : 16/678474 | |
| DATED | : April 8, 2025 | |
| INVENTOR(S) | : John E. Mixter | |

It is certified that error appears in the above-identified patent and that said Letters Patent is hereby corrected as shown below:

In the Drawings

Sheet 3 of 3, Fig. 3, reference numeral 301, Line 1, delete "301" and insert --304-- therefor In the Specification In Column 1, Line 33, delete "hyperparameter" and insert --hyper parameter-- therefor In Column 1, Lines 58-59, delete "hyperparameters" and insert --hyper parameters-- therefor In the Claims In Column 8, Line 63, in Claim 13, after "and", insert a linebreak In Column 10, Line 3, in Claim 17, after "and", insert a linebreak In Column 10, Line 14, in Claim 19, after "and", insert a linebreak Signed and Sealed this
First Day of July, 2025

Coke Morgan Stewart
*Acting Director of the United States Patent and Trademark Office*